(12) United States Patent
Imagaki et al.

(10) Patent No.: US 7,575,091 B2
(45) Date of Patent: Aug. 18, 2009

(54) ELECTRIC POWER STEERING APPARATUS

(75) Inventors: Susumu Imagaki, Tondabayashi (JP); Seiji Sunada, Nara (JP); Yoshinori Nishi, Nara (JP)

(73) Assignee: JTekt Corporation, Osaka (JP)

( * ) Notice: Subject to any disclaimer, the term of this patent is extended or adjusted under 35 U.S.C. 154(b) by 358 days.

(21) Appl. No.: 11/657,121

(22) Filed: Jan. 24, 2007

(65) Prior Publication Data

US 2007/0193821 A1 Aug. 23, 2007

(30) Foreign Application Priority Data

Jan. 30, 2006 (JP) ............................. 2006-020075

(51) Int. Cl.
*B62D 5/04* (2006.01)
(52) U.S. Cl. ...................... 180/444; 180/443
(58) Field of Classification Search ................. 180/443, 180/444
See application file for complete search history.

(56) References Cited

U.S. PATENT DOCUMENTS 4,784,234 A * 11/1988 Naito et al. ................. 180/444
2001/0040067 A1 11/2001 Murakami et al.
2007/0102228 A1 * 5/2007 Shiina et al. ................ 180/444

FOREIGN PATENT DOCUMENTS

| EP | 1 447 305 A2 | 8/2004 |
| EP | 1 731 404 A1 | 12/2006 |
| FR | 2 829 536 A1 | 3/2003 |
| JP | 2005-254864 | 9/2005 |
| JP | 2005-297824 | 10/2005 |

OTHER PUBLICATIONS

An English-language Abstract of the WO 03/023242 A1 (Mar. 20, 2003).

* cited by examiner

*Primary Examiner*—Lesley D Morris
*Assistant Examiner*—Michael R Stabley
(74) *Attorney, Agent, or Firm*—Rabin & Berdo, PC

(57) ABSTRACT

An electric power steering apparatus comprises a transmission mechanism for transmitting driving force of a steering assisting electric motor to a steering mechanism. A driven gear of the transmission mechanism is rotatably supported by first and second bearings. One of the first and second bearings includes an inner ring coupled so as to be rotatable together with an output shaft of a steering shaft, an outer ring held on a housing, and a rolling element interposed between the inner ring and the outer ring. One of the inner ring and the outer ring includes an annular elastic plate giving a preload to the rolling element.

10 Claims, 3 Drawing Sheets

ELECTRIC POWER STEERING APPARATUS

BACKGROUND OF THE INVENTION

1. Field of the Invention

The present invention relates to an electric power steering apparatus that produces a steering assist force by an electric motor.

2. Description of Related Arts

A speed reduction mechanism is used in an electric power steering apparatus for a motor vehicle. Rotation of an output shaft of an electric motor is reduced in speed by, for example, a worm shaft and a worm wheel as the speed reduction mechanism. Thereby, output of the electric motor is amplified and is transmitted to a steering mechanism. As a result, a steering operation is assisted.

The worm shaft and the worm wheel are accommodated in a housing. The worm wheel is together rotatably coupled to an output shaft of a steering shaft coupled to a steering member. The output shaft is rotatably supported by a pair of bearings arranged at both sides sandwiching the worm wheel in an axial direction of the output shaft. The pair of bearings is formed of, for example, roller bearings. Each of the pair of bearings has an inner ring coupled so as to be rotatable together with the output shaft, an outer ring held on the housing, and a rolling element interposed between the inner ring and outer ring (see Japanese Unexamined Patent Publication No. 2005-254864, for example).

However, a gap exists among the inner ring, the outer ring and the rolling elements, and due to the gap, there is a problem that noise occurs as a result of the rolling element colliding against the inner ring and the outer ring during traveling of the motor vehicle.

Therefore, an electric power steering apparatus which eliminates an internal bearing gap by giving an axial preload to the bearing by a screw member and a locking nut has been proposed (see Japanese Unexamined Patent Publication No. 2005-297824, for example).

However, the preloading components such as a screw member and a locking nut are necessary, so that the structure is complicated. For this reason, the number of components and assembly man-hours are increased.

It is an object of the present invention to provide an electric power steering apparatus that can prevent occurrence of noise by a simple structure.

SUMMARY OF THE INVENTION

In order to achieve the object as described above, a mode of the present invention provides an electric power steering apparatus including an input shaft coupled to a steering member, an output shaft coupled so as to be relatively rotatable with the input shaft, and a transmission mechanism for transmitting driving force of a steering assisting electric motor to a steering mechanism, and a housing that accommodates the transmission mechanism. The transmission mechanism includes a driving gear driven by the electric motor, a driven gear engaged with the driving gear and coupled so as to be rotatable together with the output shaft, and first and second bearings that rotatably support the driven gear. The driven gear is arranged between the first and second bearings in an axial direction of the output shaft. One of the first and second bearings includes an inner ring coupled so as to be rotatable together with the output shaft, an outer ring held on the housing, and a rolling element interposed between the inner ring and the outer ring. One of the inner ring and the outer ring includes an elastic plate giving a preload to the rolling element.

According to the present mode, by an elastic body used as the outer ring or the inner ring, a preload is given to the rolling element so that an internal bearing gap can be eliminated. As a result, occurrence of noise due to a collision of the inner ring and the outer ring against the rolling element can be prevented.

Moreover, since the inner ring or the outer ring serves also as an elastic body for preloading, it is not necessary to add new components to eliminate an internal bearing gap. The structure is simple, and no increase in the number of components and assembly man-hours occurs.

DETAILED DESCRIPTION OF THE PREFERRED EMBODIMENT

Hereinafter, embodiments of the present invention will be described in detail with reference to the drawings.

Figure 1:
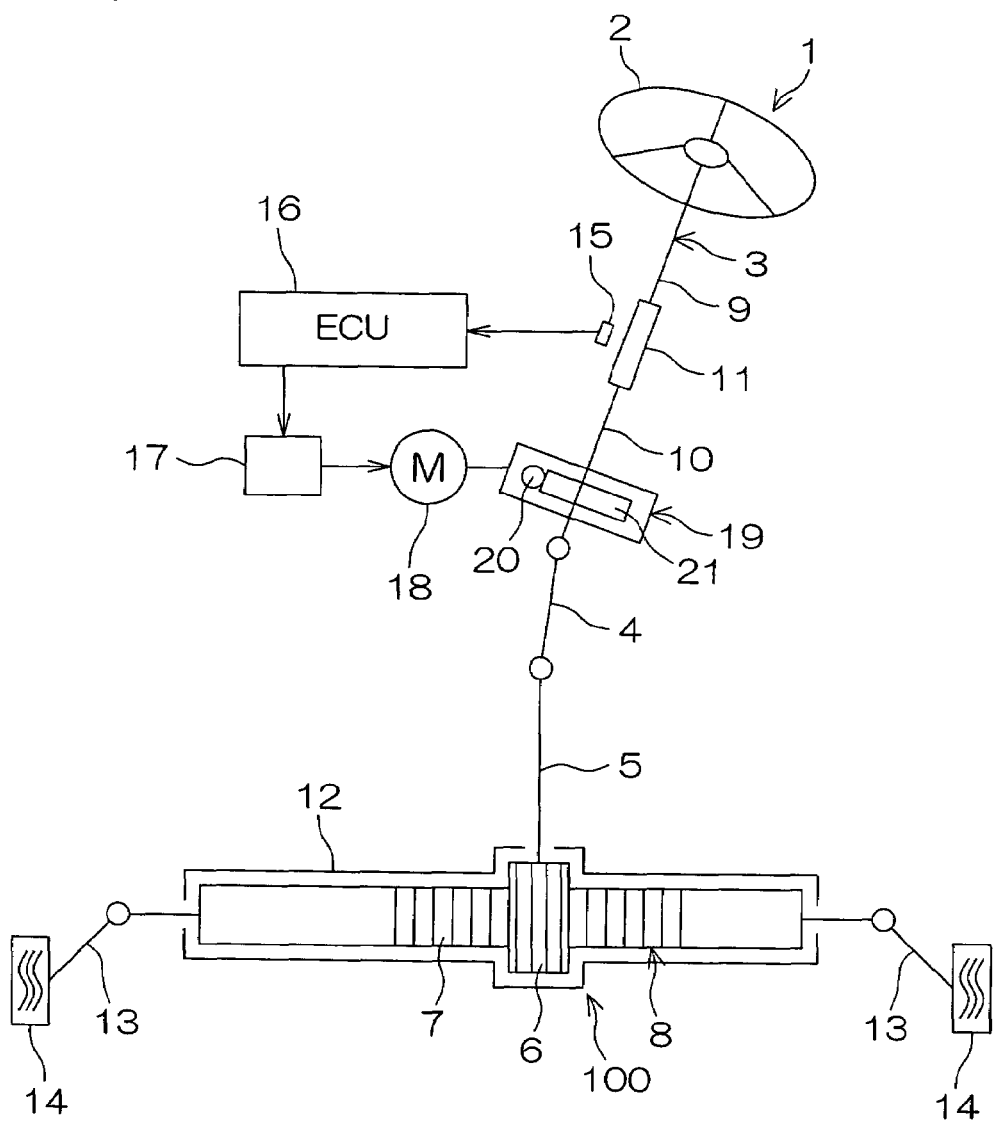
FIG. 1 is a schematic view showing a schematic configuration of an electric power steering apparatus of an embodiment of the present invention.

FIG. 1 is a schematic view showing a schematic configuration of an electric power steering apparatus 1 of an embodiment of the present invention. Referring to FIG. 1, the electric power steering apparatus 1 comprises a steering shaft 3 coupled to a steering member 2 such as a steering wheel, a pinion shaft 5 coupled to the steering shaft 3 via an intermediate shaft 4, and a rack bar 8 having a rack 7 engaged with a pinion 6 formed on the pinion shaft 5 and being a turning shaft extending in the left and right direction of an automobile. The pinion shaft 5 and the rack bar 8 form a rack and pinion mechanism 100 as a steering mechanism.

The steering shaft 3 comprises an input shaft 9 that continues to the steering member 2 and an output shaft 10 that continues to the pinion shaft 5. The input shaft 9 and the output shaft 10 are coupled so as to be relatively rotatable on an identical axis via a torsion bar 11.

The rack bar 8 is supported on a housing 12 so as to be linearly freely reciprocating via a plurality of unillustrated bearings. Both end portions of the rack bar 8 are protruded to both sides of the housing 12, and each end portion is coupled to a steerable wheel 14 via a tie rod 13 and a knuckle arm (unillustrated).

When the steering member 2 is operated, the steering shaft 3 rotates. The rotation of the steering shaft 3 is converted to a linear reciprocating motion of the rack bar 8 in the left and right direction of a motor vehicle via the pinion 6 and the rack 7. Thereby, a turn of the steerable wheels 14 is achieved.

Moreover, in the vicinity of the steering shaft 3, a torque sensor 15 is provided. The torque sensor 15 detects a steering torque given to the steering member 2 based on an amount of relative rotational displacement between the input shaft 9 and the output shaft 10. A torque value detected by the torque sensor 15 is given to an ECU (Electronic Control Unit) 16. The ECU 16 controls drive of a steering assisting electric motor 18 via a driving circuit 17 based on the torque value and a vehicle speed given by an unillustrated vehicle speed sensor.

A rotating force of the electric motor 18 outputted by control of the ECU 16 is amplified by a speed reduction mechanism 19 as a transmission mechanism, and is transmitted to the output shaft 10 of the steering shaft 3. The force transmitted to the output shaft 10 is transmitted to the rack bar 8 via the pinion shaft 5. Steering is thereby assisted.

Figure 2:
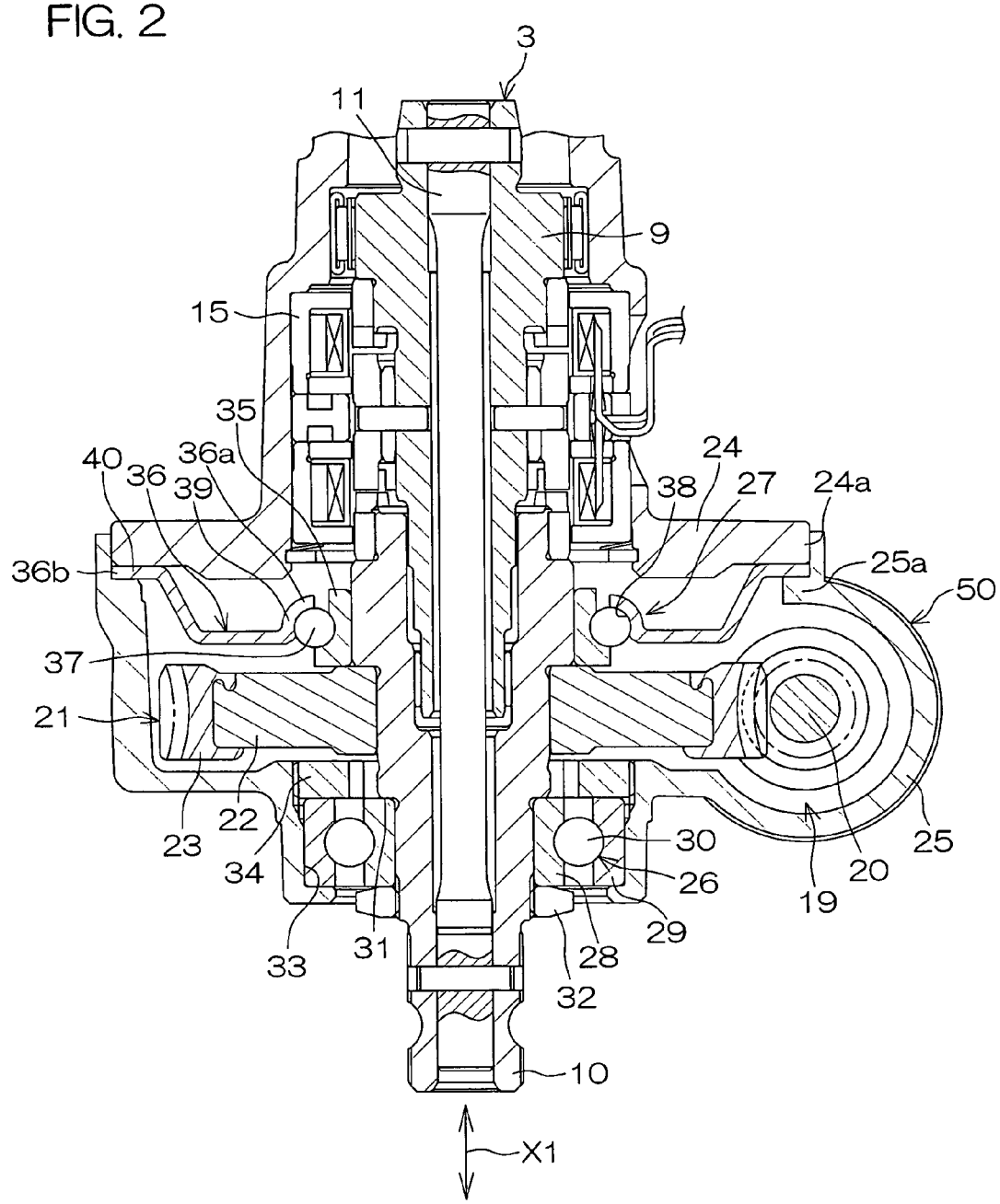
FIG. 2 is a sectional view showing a configuration of a speed reduction mechanism provided in the electric power steering apparatus of FIG. 1 and a vicinity thereof.

FIG. 2 is a sectional view showing a configuration of the speed reduction mechanism 19 provided in the electric power steering apparatus 1 of FIG. 1 and a vicinity thereof. Referring to FIG. 2, the speed reduction mechanism 19 comprises a worm shaft 20 as a driving gear rotary-driven by the electric motor 18, and a worm wheel 21 as a driven gear engaged with the worm shaft 20.

Although not illustrated, the worm shaft 20 is arranged coaxially with an output shaft of the electric motor 18, and one end of the worm shaft 20 is coupled to the output shaft of the electric motor 18 via a coupling so that a power transmission is possible.

The worm wheel 21 comprises an annular core metal 22 joined so as to be rotatable together with the output shaft 10 and a synthetic resin member 23 surrounding the core metal 22 and having teeth formed on the outer circumference. The core metal 22 is, for example, inserted in a mold at the time of resin molding of the synthetic resin member 23. The core metal 22 is fitted to the output shaft 10 of the steering shaft 3 by, for example, press-fitting and is coupled thereto. Thereby, the worm wheel 21 is made so as to be rotatable together and not to be axially movable with respect to the output shaft 10.

A housing 50 that forms a part of a steering column rotatably supporting the steering shaft 3 is provided. The housing 50 comprises a cylindrical sensor housing 24 as a first housing in which the torque sensor 15 is accommodated, and a cylindrical gear housing 25 as a second housing in which the worm shaft 20 and the worm wheel 21 are accommodated. The sensor housing 24 and the gear housing 25 are fixed to each other by, for example, fitting each other's end portions 24a and 25a together or tightening these together by a bolt or the like.

Moreover, in the gear housing 25, first and second bearings 26 and 27 for rotatably supporting the worm wheel 21 via the output shaft 10 are provided. The first and second bearings 26 and 27 are formed of roller bearings. In the present embodiment, radial ball bearings are used as the roller bearings.

The worm wheel 21 is arranged between the first and second bearings 26 and 27 in an axial direction X1 of the output shaft 10. The second bearing 27 is arranged between the torque sensor 15 and the worm wheel 21 in the axial direction X1 of the output shaft 10.

The first bearing 26 has an inner ring 28, an outer ring 29, and a rolling element 30. The inner ring 28 is fitted to the output shaft 10, and is clamped in the axial direction X1 of the output shaft 10 by an annular stepped portion 31 formed on the output shaft 10 and a nut 32 screwed to a screw portion of the output shaft 10. Thereby, the inner ring 28 is coupled so as to be rotatable together and not to be axially movable in the output shaft 10.

Moreover, the outer ring 29 is fitted to a bearing holding hole 33 of the gear housing 25, and is clamped in the axial direction X1 of the output shaft 10 by a part of the gear housing 25 and a fixing member 34 fitted to a screw portion of the bearing holding hole 33. Thereby, the outer ring 29 is made so as not be movable with respect to the gear housing 25.

The second bearing 27 has an inner ring 35, an annular elastic plate 36 as an outer ring, and a rolling element 37. The inner ring 35 is fitted to the output shaft 10. One axial end of the inner ring 35 is positioned in the axial direction X1 of the output shaft 10 by the core metal 22 of the worm wheel 21.

The elastic plate 36 as an outer ring is formed of a sheet metal such as a high-tensile steel plate or a spring steel plate. The plate thickness of the elastic plate 36 is set to, for example, 1.0 mm.

The annular elastic plate 36 as an outer ring has a radially inner end 36a and a radially outer end 36b and forms, for example, a disc spring in a truncated conical shape.

Moreover, at the radially inner end 36a of the elastic plate 36, an annular raceway forming portion 39 that forms a raceway 38 for the rolling element 37 is provided. The raceway 38 has a circular arc shape in a section. At the radially outer end 36b of the elastic plate 36, an annular fixing portion 40 is formed.

The annular fixing portion 40 is sandwiched between the mutually opposing end portions 24a and 25a of the sensor housing 24 and gear housing 25, is tightened together with these end portions 24a and 25a, and is as a result fixed to both housings 24 and 25.

With the fixing portion 40 being fixed to both housings 24 and 25 and the raceway forming portion 39 thereof receiving the rolling element 37, the elastic plate 36 is elastically deformed so that the fixing portion 40 and the raceway forming portion 39 approach each other in the axial direction of the second bearing 27.

A restoring force against the elastic deformation of the elastic plate 36 is given to the rolling element 37 via the raceway forming portion 39. More specifically, by the elastic plate 36 as an outer ring, the rolling element 37 is elastically charged in the axial direction of the second bearing 27 (direction to approach the worm wheel 21), so that a preload in the bearing axial direction is given to the rolling element 37.

Consequently, an internal gap of the second bearing 27 is eliminated, so that occurrence of noise caused by a collision of the rolling element 37 against the inner ring 35 and the like can be prevented. In addition, since a preload is given to the rolling element 37 by the outer ring itself formed of the elastic plate 36, it is not necessary to newly add a preloading component. Consequently, no increase in the number of components and assembly man-hours occurs.

In the above embodiment, although a description has been given for a case where the fixing portion 40 of the radially outer end 36b of the elastic plate 36 as an outer ring of the second bearing 27 is tightened together with the sensor housing 24 and gear housing 25, it is not limitative. For example, the fixing portion 40 may be fixed to either one of the sensor housing 24 and gear housing 25 by a method such as press-fitting, welding, adhesion, or tightening by a bolt.

Figure 3:
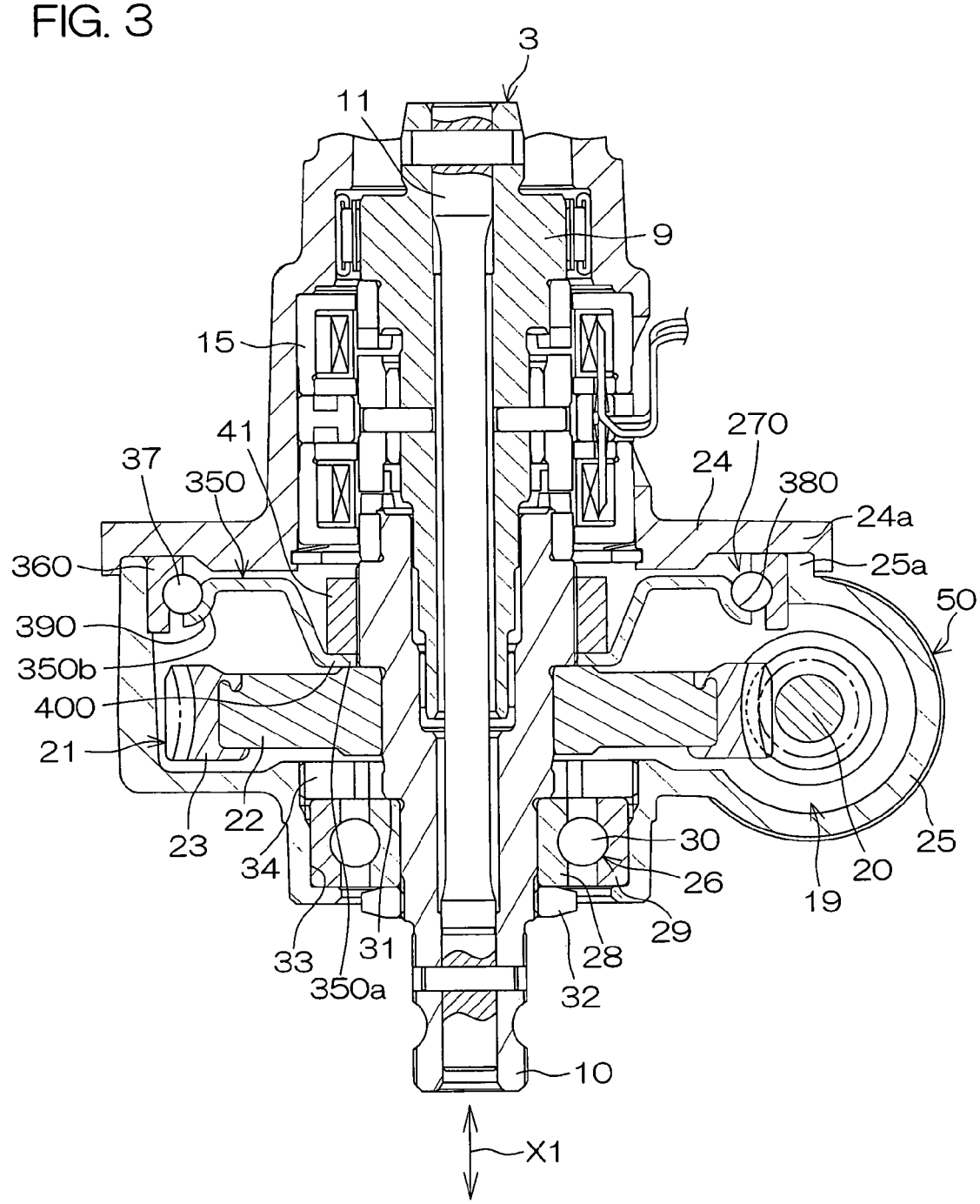
FIG. 3 is a sectional view showing a configuration of a speed reduction mechanism in another embodiment of the present invention and a vicinity thereof.

FIG. 3 is a sectional view showing a configuration of the speed reduction mechanism 19 in another embodiment of the present invention and a vicinity thereof. In FIG. 3, components equivalent to respective portions shown in FIG. 1 and FIG. 2 will be denoted with the same reference numerals as those in the above FIG. 1 and FIG. 2 so as to omit description thereof.

Referring FIG. 3, the present embodiment differs from the above embodiment mainly in the following. That is, a second bearing 270 includes an annular elastic plate 350 as an inner ring, an outer ring 360, and the rolling element 37, and a preload in the bearing axial direction is given to the rolling element 37 by the elastic plate 350 as an inner ring.

The elastic plate 350 as an inner ring is formed of a sheet metal such as a high-tensile steel plate or a spring steel plate. The plate thickness of the elastic plate 350 is set to, for example, 1.0 mm. Moreover, the annular elastic plate 350 as an inner ring has a radially inner end 350a and a radially outer end 350b and forms, for example, a disc spring in a truncated conical shape.

Moreover, at the radially outer end 350b of the elastic plate 350, a raceway forming-portion 390 that forms a raceway 380 for the rolling element 37 is provided. The raceway 380 has a circular arc shape in section. At the radially inner end 350a of the elastic plate 350, an annular fixing portion 400 is formed.

The annular fixing portion 400 is fitted to the output shaft 10, and is clamped in the axial direction X1 of the output shaft 10 by the core metal 22 of the worm wheel 21 and a fixing member 41 fixed to the output shaft 10 by, for example, screwing. As a result, the fixing portion 400 of the elastic plate 350 as an inner ring is made so as to be rotatable together and not to be axially movable with respect to the output shaft 10.

The outer ring 360 is fitted to the inner circumference of the end portion 25a of the gear housing 25. Moreover, the outer ring 360 is restricted in its axial movement by the end portion 24a of the sensor housing 24 and an annular stepped portion at the inner circumference of the gear housing 25.

With the fixing portion 400 being fixed to the output shaft 10 and the raceway forming portion 390 thereof receiving the rolling element 37, the elastic plate 350 is elastically deformed so that the fixing portion 400 and the raceway forming portion 390 approach each other in the axial direction of the second bearing 270.

A restoring force against the elastic deformation of the elastic plate 350 is given to the rolling element 37 via the raceway forming portion 390. More specifically, by the elastic plate 350 as an inner ring, the rolling element 37 is elastically charged in the axial direction of the second bearing 270 (direction to go away from the worm wheel 21), so that a preload in the bearing axial direction is given to the rolling element 37.

This allows eliminating an internal gap of the second bearing 270, so that occurrence of noise caused by a collision of the rolling element 37 against the outer ring 360 and the like can be prevented. In addition, since a preload is given to the rolling element 37 by the inner ring itself formed of the elastic plate 350, it is not necessary to newly add a preloading component. Consequently, no increase in the number of components and assembly man-hours occurs.

In the above respective embodiments, although a description has been given for a case where the outer ring of the second bearing 27 comprises the elastic plate 36 made of a sheet metal and a case where the inner ring of the second bearing 270 comprises the elastic plate 350 made of a sheet metal, alternatively, either one of the inner ring 28 and outer ring 29 of the first bearing 26 may be formed of an elastic plate made of a sheet metal.

As in the above, although the present invention has been described in detail by concrete embodiments, a person skilled in the art who has understood the above-described contents will easily conceive modifications, alterations, and equivalents thereof. Accordingly, the present invention should have a scope of claims and a scope of equivalents thereof.

The present application corresponds to the Japanese Patent Application No. 2006-20075 filed on Jan. 30, 2006 to the Japan Patent Office, and the entire disclosure of this application is herein incorporated by citation.

What is claimed is:

1. An electric power steering apparatus comprising:
an input shaft coupled to a steering member;
an output shaft coupled so as to be relatively rotatable with the input shaft;
a transmission mechanism for transmitting driving force of a steering assisting electric motor to a steering mechanism; and
a housing that accommodates the transmission mechanism, wherein
the transmission mechanism includes a driving gear driven by the electric motor, a driven gear engaged with the driving gear and coupled so as to be rotatable together with the output shaft, and first and second bearings that rotatably support the driven gear,
the driven gear is arranged between the first and second bearings in an axial direction of the output shaft,
one of the first and second bearings includes an inner ring coupled so as to be rotatable together with the output shaft, an outer ring held on the housing, and a rolling element interposed between the inner ring and the outer ring, and
one of the inner ring and the outer ring includes an annular elastic plate giving a preload to the rolling element.

2. The electric power steering apparatus according to claim 1, wherein
the elastic plate includes an elastic plate that forms the outer ring.

3. The electric power steering apparatus according to claim 1, wherein
the elastic plate includes an elastic plate that forms the inner ring.

4. The electric power steering apparatus according to claim 1, wherein
the elastic plate includes a radially inner end, a radially outer end, and a raceway forming portion that forms a raceway for the rolling element.

5. The electric power steering apparatus according to claim 1, wherein
the elastic plate includes an elastic plate that forms the outer ring,
the elastic plate that forms the outer ring includes a radially inner end, a radially outer end, and a raceway forming portion that forms a raceway for the rolling element, and
the raceway forming portion is provided at the radially inner end of the elastic plate that forms the outer ring.

6. The electric power steering apparatus according to claim 5, wherein
the radially outer end of the elastic plate that forms the outer ring is fixed to the housing.

7. The electric power steering apparatus according to claim 6, wherein
the housing includes first and second housings joined with each other, and
the radially outer end of the elastic plate that forms the outer ring is clamped between the first and second housings.

8. The electric power steering apparatus according to claim 1, wherein
the elastic plate includes an elastic plate that forms the inner ring,
the elastic plate that forms the inner ring includes a radially inner end, a radially outer end, and a raceway forming portion that forms a raceway for the rolling element, and
the raceway forming portion is provided at the radially outer end of the elastic plate that forms the inner ring.

9. The electric power steering apparatus according to claim 8, wherein
the radially inner end of the elastic plate that forms the inner ring is coupled so as to be rotatable together with the output shaft.

10. The electric power steering apparatus according to claim 9, wherein
the radially inner end of the elastic plate that forms the inner ring is clamped between the driven gear and a fixing member fixed to the output shaft.

* * * * *